Patented Jan. 5, 1932

1,840,035

UNITED STATES PATENT OFFICE

EDWARD T. HOWELL AND OTTO STALLMANN, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

AMINO BENZYL ORTHO BENZOIC ACIDS AND PROCESS OF PREPARING THE SAME

No Drawing.    Application filed July 2, 1928.   Serial No. 290,033.

This invention relates to p' amino benzyl ortho benzoic acid and its N- substitution products, as for example p' acetyl amino benzyl ortho benzoic acid, p' phthalylamino benzyl ortho benzoic acid and the like.

It is an object of this invention to provide a method of preparing p' amino benzyl ortho benzoic acid and its N- substitution products, which are valuable products of themselves and more particularly so when used as starting materials for the preparation of other products.

We have found that p' amino benzoyl ortho benzoic acid, described in U. S. Patent No. 1,654,290, may be reduced to form p' amino benzyl ortho benzoic acid, and further that either or both of the hydrogen atoms attached to the nitrogen atom on the latter body may be substituted by such groups as the acidyls, as for example benzoyl, acetyl, phthalyl, urea and the like, or by the benzylidene group. We have similarly found that an N- substituted p' amino benzoyl ortho benzoic acid, a subject of our copending application Serial No. 290,032, filed July 2, 1928, may be reduced to the corresponding N- substituted p' amino benzyl benzoic acid, as for example p' phthalylamino benzyl ortho benzoic acid. These compounds possess certain advantages when used as starting materials for the preparation of anthraquinone bodies, as described in the copending application of one of us, Serial No. 290,034, filed of even date herewith.

We are aware of the fact that p' dimethyl amino benzyl ortho benzoic acid has been described in the literature and we do not include it in this invention. We include besides p' amino benzyl ortho benzoic acid only those nitrogen substitution products of p' amino benzyl ortho benzoic acid which are easily hydrolyzable back to p' amino benzyl ortho benzoic acid and which after condensation in concentrated sulfuric acid followed by oxidation either are or may be readily hydrolyzed to the beta amino anthraquinone body. These nitrogen substitution products are characterized by containing in the amino group a residue of a series typified by the following members:

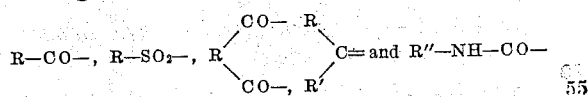

and the like in which R is an organic radical, R' an organic radical or hydrogen and R'' another benzoyl-ortho-benzoic acid residue. A typical compound not included in the above series is the dimethyl derivative, since the final product, beta dimethyl amino anthraquinone, can be hydrolyzed only with difficulty.

By the term residue of a monovalent acidylating agent as used in the claims, we mean to include such members of the above referred to series which contain only one free bond, such as, for example,

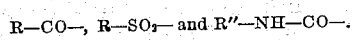

By the term residue of a divalent acidylating agent as used in the claims, we mean to include those members of the above referred to series which contain two free bonds such as, for example,

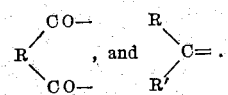

Included in our invention are the following products:

p' amino benzyl ortho benzoic acid
p' (p toluene sulfonamido) benzyl ortho benzoic acid
p' benzene sulfonamido benzyl ortho benzoic acid
p' phthalyl amido benzyl ortho benzoic acid urea of p' amino benzyl ortho benzoic acid
p' benzylidene amino benzyl ortho benzoic acid
p' benzoyl amino benzyl ortho benzoic acid
p' acetyl amino benzyl ortho benzoic acid In general, known methods for preparing analogous derivatives of other amines may be employed to prepare these new substitution products.

The process of our invention may probably be best expressed by the following equation:

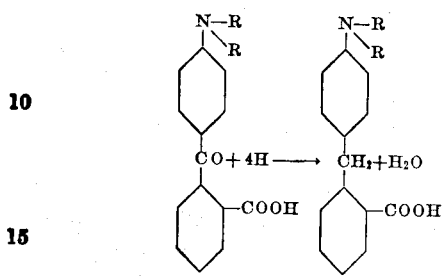

wherein R is a hydrogen atom or a substituent such as an acidyl group, benzylidene, urea and the like. The reduction is effected in an ammoniacal solution by means of zinc and a copper salt.

Without limiting our procedure to any specific method the following examples in which parts by weight are given, will serve to illustrate preferred embodiments of our invention.

*Example 1.—p' amino benzyl ortho benzoic acid*

10 parts of p' amino benzoyl ortho benzoic acid are dissolved in 125 parts of 10% ammonia at room temperature. There are then added to this solution 25 parts of ammoniacal copper sulfate solution, prepared by adding 2 normal ammonia solutions to 10 parts of 2 normal copper sulfate solution until the precipitate which at first forms just disappears. 20 parts of zinc dust are suspended in 25 parts of water and heated to 80° C. To this water suspension of the zinc dust is added the above prepared solution of the p' amino benzoyl ortho benzoic acid, holding the temperature at about 75° C., over a period of about 40 minutes. The mass is agitated for an additional 12 hours at 75–80° C. under a reflux condenser. The reduction mixture is then filtered and the product precipitated by neutralizing the filtrate with sulfuric acid. The product, p' amino benzyl ortho benzoic acid, is filtered off and dried. Upon crystallizing from alcohol, the product may be purified to a melting point of 173° C. The product obtained is very soluble in dilute caustic soda or ammonia solutions and somewhat soluble in dilute sulfuric or hydrochloric acids or in chlorobenzene. It is sparingly soluble in benzene, toluene, xylene and the like. The amine may be diazotized to give a soluble diazo body.

The p' amino benzyl ortho benzoic acid may be prepared from p' amino benzoyl ortho benzoic acid by other known methods of preparing similar compounds. The generally known methods applicable to similar compounds although included in our invention are not to be preferred.

*Example 2.—p' acetyl amino benzyl ortho benzoic acid*

5 parts of p' amino benzyl ortho benzoic acid are boiled with 10 parts of glacial acetic acid and 2.5 parts of acetic anhydride for about 10 minutes. The mass is cooled, whereupon crystals of p' acetyl amino benzyl ortho benzoic acid separate and are filtered off. Upon recrystallizing from alcohol, the melting point is 205° C. The compound is a white to cream colored crystalline powder, easily soluble in such solvents as alcohol, warm glacial acetic and acetone, but difficultly soluble in chloroform, benzene and toluene.

We are aware that many changes may be made, and numerous details of the process may be varied through a wide range without departing from the principles of this invention, and we therefore do not purpose limiting the patent granted hereon, otherwise than necessitated by the prior art.

We claim as our invention:

1. The process of preparing p'-aminobenzyl-ortho-benzoic acids of the following probable general formula:

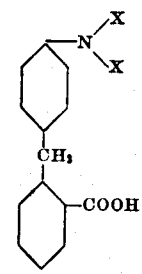

in which the two X's stand for two hydrogen atoms, or in which one X stands for one hydrogen atom and one X stands for a residue of a monovalent acidylating agent, or in which both X's stand for the residue of a divalent acidylating agent, which comprises reducing the corresponding p'-amino-benzoyl-ortho-benzoic acids.

2. The process of preparing p'-amino-benzyl-ortho-benzoic acid which comprises reducing p'-amino-benzoyl-ortho-benzoic acid.

3. The process of preparing p'-amino-benzyl-ortho-benzoic acid which comprises reducing p'-amino-benzoyl-ortho-benzoic acid with zinc in an ammoniacal solution at an elevated temperature.

4. The process of preparing p'-amino-benzyl-ortho-benzoic acid which comprises reducing p'-amino-benzoyl-ortho-benzoic acid with zinc in an ammoniacal solution at an elevated temperature in the presence of copper salts.

5. As new articles of manufacture, p'- amino-benzyl-ortho-benzoic acids of the following probable general formula:

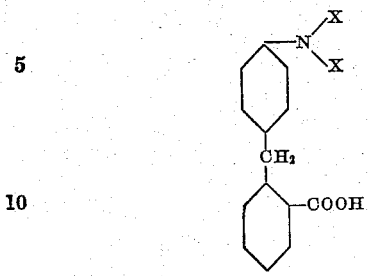

in which the two X's stand for two hydrogen atoms, or in which one X stands for one hydrogen atom and one X stands for a residue of a monovalent acidylating agent, or in which both X's stand for the residue of a divalent acidylating agent.

6. As new articles of manufacture, p'-acidylamino-benzyl-ortho-benzoic acids.

7. As a new article of manufacture, p'-amino-benzyl-ortho-benzoic acid.

8. As a new article of manufacture, p'-benzylidine-amino-benzyl-ortho-benzoic acid.

In testimony whereof we have hereunto subscribed our names at Carrollville, Milwaukee County, Wis.

EDWARD T. HOWELL.
OTTO STALLMANN.